United States Patent [19]

Neugebauer et al.

[11] 4,435,642

[45] Mar. 6, 1984

[54] ION MASS SPECTROMETER

[75] Inventors: Marcia M. Neugebauer, Altadena; Douglas R. Clay, La Crescenta; Bruce E. Goldstein, Pasadena; Raymond Goldstein, Monrovia, all of Calif.

[73] Assignee: The United States of America as represented by the United States National Aeronautics and Space Administration, Washington, D.C.

[21] Appl. No.: 361,216

[22] Filed: Mar. 24, 1982

[51] Int. Cl.³ ........................ B01D 59/48; H01J 49/26

[52] U.S. Cl. .................................................... 250/296

[58] Field of Search ................ 250/296, 297, 299, 300

[56] References Cited

U.S. PATENT DOCUMENTS 3,986,024 10/1976 Radermacher ...................... 250/299

4,171,482 10/1979 Vastel ................................ 250/296

4,307,295 12/1981 Barber et al. ....................... 250/296

*Primary Examiner*—Alfred E. Smith

*Assistant Examiner*—Constantine Hannaher

*Attorney, Agent, or Firm*—Paul F. McCaul; Thomas H. Jones; John R. Manning

[57] ABSTRACT

An ion mass spectrometer is described which detects and indicates the characteristics of ions received over a wide angle, and which indicates the mass to charge ratio, the energy, and the direction of each detected ion. The spectrometer includes a magnetic analyzer (18) having a sector magnet (24) that passes ions received over a wide angle, and an electrostatic analyzer (30) positioned to receive ions passing through the magnetic analyzer. The electrostatic analyzer includes a two dimensional ion sensor (32) at one wall of the analyzer chamber, that senses not only the lengthwise position of the detected ion to indicate its mass to charge ratio, but that also detects the ion position along the width of the chamber to indicate the direction in which the ion was travelling.

6 Claims, 6 Drawing Figures

ION MASS SPECTROMETER

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 42 USC 2457).

BACKGROUND OF THE INVENTION

The analysis of ions in space has been conducted principally by use of electrostatic analyzers or by mass spectrometers. The former measures the ion energy per unit charge (proportional to $mv^2/q$, where m is mass, v is velocity, and q is charge), while the latter measures m/q in cases in which the velocity is either negligible or assumed to be known. Some space projects require an instrument which can unambiguously measure ion m/q, energy, and direction with as high an efficiency and speed as possible over a wide energy range and angular field of view.

In recent years, energetic ion mass spectrometers have been developed which have a magnetic analyzer in front of or behind an electrostatic analyzer. Most analyzers of this type have only a single sensor. Only ions with a particular m/q, v, and direction can pass through the analyzers to the detector at any one time. The ion population is studied by varying the voltage on the electrostatic analyzer as well as an accelerating voltage, and by pointing the instrument in different directions at different times. Other ion spectrometers have been built which use an electric (or magnetic) field to spread out a beam of ions which has been preselected by a magnetic (or electric) analyzer. The dispersed beam can be sensed with a line of detectors, with each element in the line corresponding to a fixed value of m/q. These instruments must also be pivoted in two dimensions to detect ions over a wide solid angle, to obtain directional information, and scanned in voltage to measure the ion energy.

An ion mass spectrometer that could analyze ions received over a wide range of angles and which could simultaneously determine each ion's angle, m/q, and energy, would be of considerable value in space research.

It is desireable to measure rapidly four properties or parameters of ions—namely the mass charge ratio, the energy, the elevation angle, and the azimuth angle. With a single sensor, one must scan through each of these four parameters sequentially in time. With a line of detectors, one parameter can be measured continually while the other three are sequenced. The invention described herein has the capability of measuring two properties continuously on a two dimensional sensor, so only two remaining properties need to be measured on a time-shared basis.

SUMMARY OF THE INVENTION

In accordance with one embodiment of the present invention, an ion mass spectrometer is provided, which can detect ions received over a wide angle, and which indicates the angle at which each detected ion was received. The apparatus includes a magnetic analyzer for passing ions of a limited momentum to charge ratio, followed by an electrostatic analyzer that detects ions and indicates their characteristics. The apparatus is constructed so that the magnetic analyzer passes ions received over a wide angle, and the electrostatic analyzer indicates the angle of motion of each detected ion. The electrostatic analyzer includes a chamber which establishes an electric field across its thickness to deflect ions against a predetermined chamber wall, and includes a two-dimensional sensor at the predetermined wall. The two dimensional sensor indicates not only the distance an ion travels along the length of the electrostatic chamber, which depends upon the mass-to-charge ratio of the ion, but also indicates the sideward position of the ion when it reaches the sensor to indicate the angle of the path of the ion.

The novel features of the invention are set forth with particularity in the appended claims. The invention will be best understood from the following description when read, in conjunction with the accompanying drawings.

DESCRIPTION OF THE PREFERRED EMBODIMENTS

Figure 1:
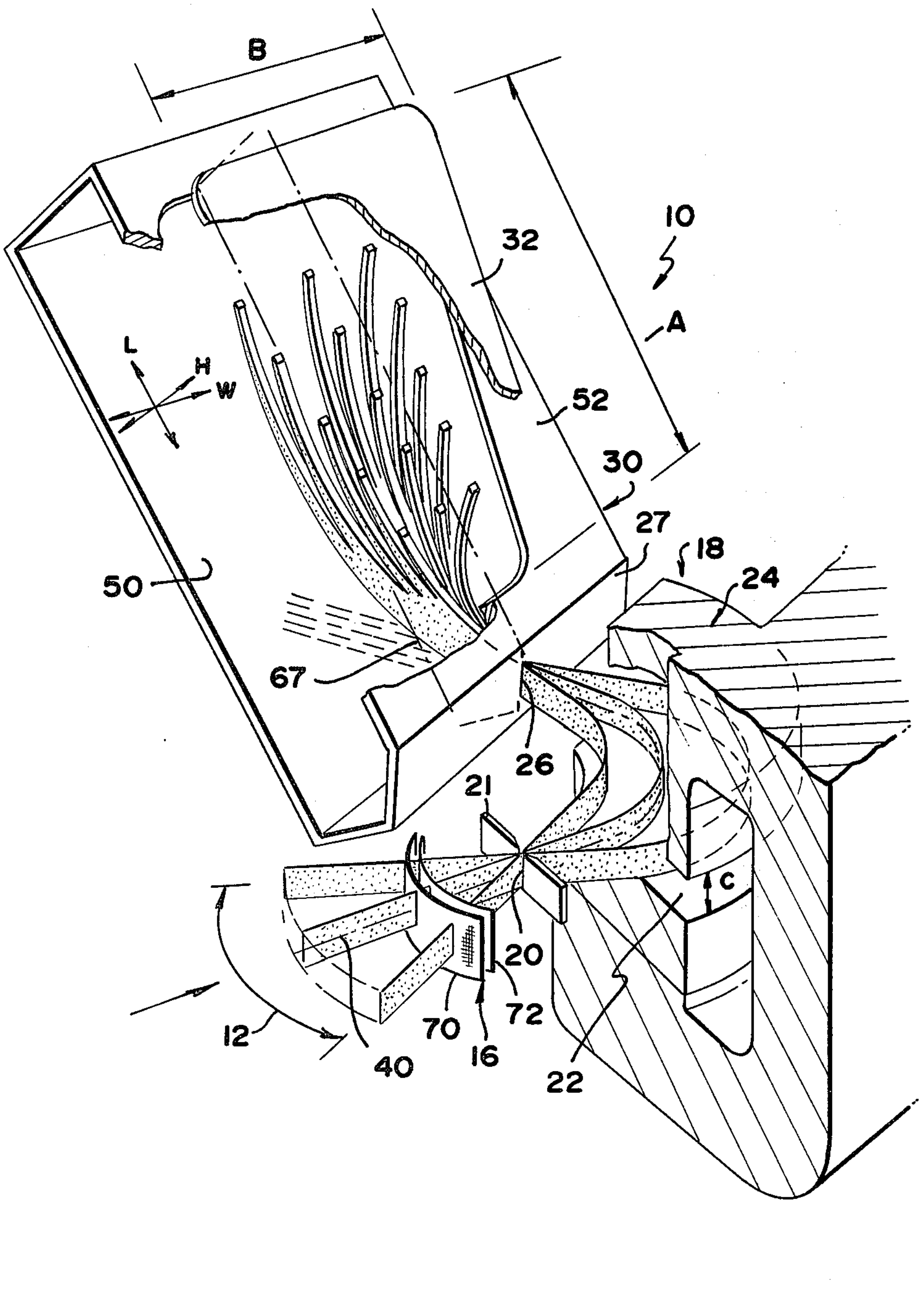
FIG. 1 is a simplified perspective view of an ion mass spectrometer apparatus constructed in accordance with the invention.

FIG. 1 illustrates an ion mass spectrometer 10 which can detect energetic ions received over a wide elevation angle such as 60°, indicated at 12. The ions first pass through an accelerator grid device 16 which changes the energy of the ions, to permit the detection of ions of a wide range of energies. The ions then travel towards a magnetic analyzer 18 which acts as a filter that passes only ions of a particular ratio of momentum to charge. The ions enter the magnetic analyzer through a slit-shaped entrance opening 20 in a wall 21, pass through a gap 22 of a magnet 24 of the analyzer, and leave through a slit-shaped exit opening 26 in a wall 27 of the analyzer. The ions finally enter an electrostatic analyzer 30 where they are detected by a two-dimensional position-sensitive detector 32. The detector 32 has a length dimension A along which ions are separated according to their mass to charge ratio, and has a width dimension B along which ions can be differentiated according to their initial angle of incidence.

Figure 2:
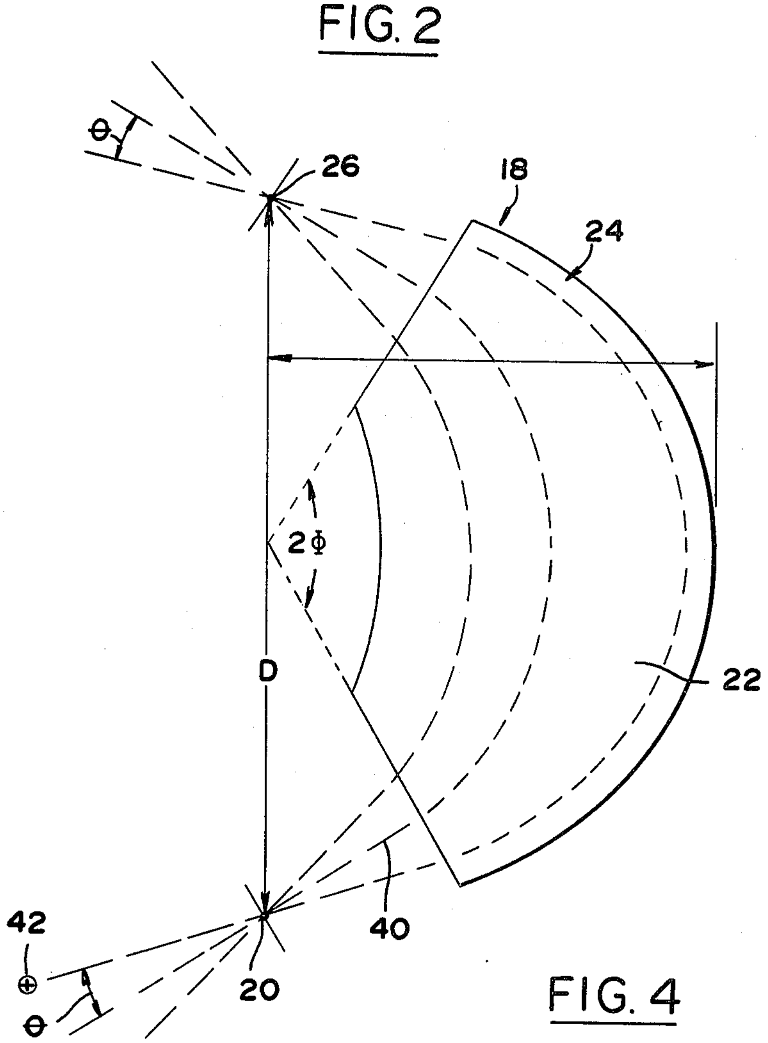
FIG. 2 is a simplified view of the magnetic analyzer of the apparatus of FIG. 1.

The basic principles of operation of the instrument can be best understood by considering the operations of the magnetic and electrostatic analyzers 18, 30. The magnetic analyzer 18 serves as a filter that passes only ions of a particular momentum to charge ratio, but has a very wide angular acceptance. In the magnetic analyzer as shown in FIG. 2, the centerline 40 represents the center of the path of ions that can pass through the device. If an ion indicated at 42 is incident on the entrance slit opening 20 at an angle $\theta$ with respect to the centerline, then that ion can pass through the exit slit opening 26 only if the following equation holds for that ion:

$$\frac{P_o}{q} = \frac{m}{q} v \cos\theta = \tfrac{1}{2} BD \sin\Phi$$

where $P_o$ represents the component, or projection, of the momentum of the ion along the direction of the centerline of the path (momentum equals mass times velocity), q is the charge of the ion, m is the mass of the ion, v is the velocity of the ion, $\theta$ is the angle between the velocity vector of the ion and the centerline 40 at the entrance opening 20, B is the magnetic field strength, $\Phi$ is the half angle of the magnet, and D is the line-of-sight distance between the entrance and exit openings, 20, 26. The two slits 20 and 26 and the effective tip of the sector magnet 24 must be co-aligned, with the magnet 24 located midway between slits 20 and 26. It should be noted that Equation (1) is valid for arbitrarily large angles $\theta$, which may be compared with the situation in most spectrometers wherein small angle approximations are used. The entering and emerging trajectories are symmetric, so that the angle $\theta$ at the exit slit opening 26 is the same as at the entrance slit opening 20.

In order to permit the passage of ions received over a wide azimuth angle such as ±30°, the magnet 24 is provided with a wide gap 22 (FIG. 2). The gap 22 is sufficiently large to maintain a uniform field over the curved trajectory of an ion, for the largest value of $\theta$ desired to be measured. Areas on either side of the path centerline 40 are free of obstruction, to permit the passage of ions whose angle is up to a maximum acceptance angle $\theta$ max, such as 30° on either side of the centerline 40 at the entrance opening 20. One magnetic analyzer that has been constructed, had the values B of 3510 gauss, $\Phi$ of 60°, and D of 8.5 centimeters. The gap thickness C was about 0.7 centimeters.

All of the ions which leave the magnetic analyzer 18 have nearly the same value of $P_o/q$. In the next stage of analysis in the electrostatic analyzer 30 (FIG. 1), an electrostatic field deflects those particles by an amount which depends upon the mass to charge ratio of the ion. The electrostatic analyzer includes walls forming a chamber 50 of generally rectangular cross section, which has length, height, and width dimensions along the arrows L, H, and W, respectively. An electric field is established in the chamber 50 that is primarily along the height direction H of the chamber. The electrostatic field deflects ions that enter the chamber through the slit 26, so they are deflected upwardly towards an upper wall 52 of the chamber. Accordingly, the chamber is oriented so its longitudinal plane or axis L is at an upward tilt such as 30° from the plane of the ion path such as 40 in the magnetic analyzer.

Figure 3:
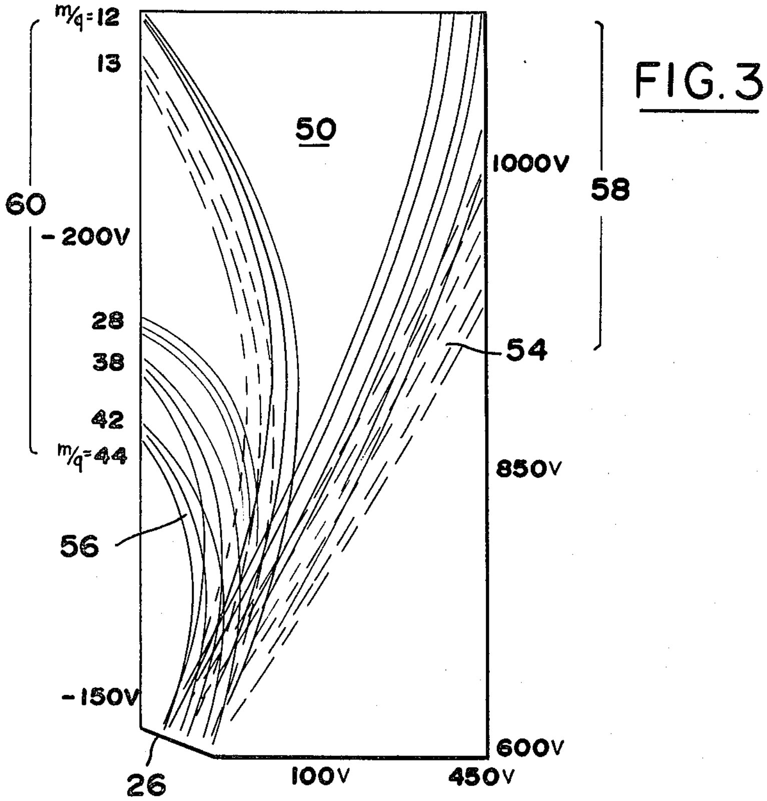
FIG. 3 is a simplified sectional view of the electrostatic analyzer of FIG. 1.

Each ion entering the electrostatic chamber 50 is subjected to an upward force proportional to its charge. The distance the ion travels along the length L before it reaches the top of the chamber varies approximately as the square root of its kinetic energy. Since the magnetic analyzer passes only ions of a particular momentum to charge ratio, the lighter ions have a higher speed and more energy than the heavy ions. The lighter ions thus travel further along the chamber before hitting its top. FIG. 3 is a simplified view of the chamber 50 of an electrostatic analyzer that has been constructed, showing the voltages at various points along the largely semiconductor chamber walls, and the paths undertaken by ions of various mass to charge (m/q) ratios. Those ions with an m/q of 1, pass in a nearly straight line along the path 54, while those of progressively greater m/q are deflected progressively more, until those ions of an m/q of 44 are deflected along the path 56. The geometry and voltages for the chamber of FIG. 3, were designed for use in a comet exploration mission wherein ions with a mass to charge ratio of 12 to 45 AMU/q (atomic mass unit per proton charge), and solar wind ions of hydrogen and helium, are of principal interest. The hydrogen and helium ions can be detected in the region 58, while the other ions can be detected in the region 60. Alternatively, hydrogen and helium can be focussed and detected at the top of the chamber by increasing the voltages to values greater than those shown in the example in FIG. 3.

Figure 4:
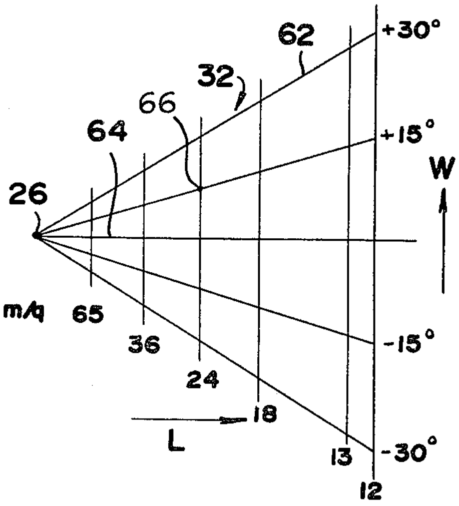
FIG. 4 is a simplified plan view of one type of sensor of the electrostatic analyzer of FIG. 1.

FIG. 4 shows the basic configuration of an ion detector 32 that can cover the region 60 in the electrostatic detector of FIG. 3. The detector 32 (FIG. 4) has a triangular shape as shown at 62. It can detect ions along an azimuth angle of +30° and −30° from a centerline 64 of the detector that is assumed to be at 0°. That is, the detector portion extending along its centerline 64, detects ions travelling along the centerline 40 of the magnetic analyzer. By utilizing a detector that can detect the two dimensional position of an ion reaching the detector, it is possible to determine both the m/q ratio and the azimuth angle of the velocity vector of a detected ion. For example, whenever a detector element at the position 66 detects an ion, it is known that that ion has a m/q ratio of 24 and was oriented at an azimuth angle of +15° with respect to the centerline 64, and therefore with respect to the centerline of the field of view of the entire system. Of course, all ions travelling along the centerline at the instrument, will move along a central plane 67 (FIG. 1) of the electrostatic analyzer and be detected along the centerline 64 of the detector.

Figure 6:
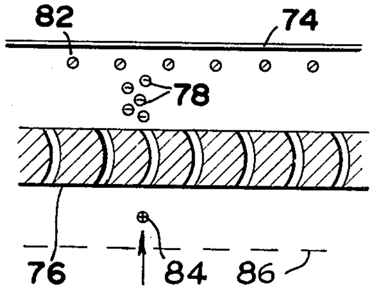
FIG. 6 is a partial sectional view of the sensor of FIG. 1.

A variety of devices are available that can detect an ion. FIG. 6 shows a portion of one such device, wherein an ion 84 passes through a grid 86 lying at the top of the chamber in FIG. 3, and is accelerated through a potential drop of approximately 2500 volts toward a microchannel plate device 76 to produce an avalanche of electrons at 78 that deposit their charges on one of a group of parallel wires 82. The combined charge is conducted to a detector that records the particular wire that received the current pulse, thus determining the position at which the ion reached the triangular sensor 32. A second set of conductors 74 can determine position along the other axis. Of course, the sensor does not have to be triangular, although only the triangular portion indicated in FIG. 4 will actually detect ions. A large number of charge-receiving conductors 82 and 74, such as fifty, extend across the width direction W and length direction L of the detector, so that a pulse on two conductors in different directions indicates an ion of a particular m/q ratio and angle. Alternatively, readout devices are available which collect all the charge on a single plate of resistive material and measure the time required for the charge to diffuse to each edge of the plate. Another two-dimensional detector can be used to cover the area 58 (FIG. 3) to detect the mass to charge ratio and angular direction of light ions (hydrogen and helium nuclei).

The accelerator grid structure 16 of FIG. 1 is utilized to permit the entrance and detection of ions of any momentum to charge ratio within a wide range. As discussed above, the only ions which will pass through the magnetic analyzer 18 are those having the particular value of $P_{o/q}$ (which is determined by the configuration of the magnetic analyzer, and is known), so that ions of a particular mass to charge ratio will pass through the magnetic analyzer only if they have a particular velocity. In order to permit ions of different velocities to enter the system, the accelerator grid device 16 is used to accelerate or decelerate incoming ions. As a result, ions of different initial velocities can be speeded up or slowed down to the velocity that will permit such ions to pass through the system. The original velocity of a detected ion can be determined by the equation:

$$v = \left[ \left( \frac{P_o/q}{\frac{m}{q} \cos \theta} \right)^2 + \frac{2\,V}{m/q} \right]^{1/2}$$

where $P_{o/q}$ is a known constant for a particular magnetic analyzer, V is the voltage across the grids of the accelerator device at the time of detection, and m/q and $\theta$ are detected for the ion.

The accelerator device 16 includes a pair of concentric cylindrical grids 70, 72 in front of the entrance opening or slit 20. The front grid 70 is grounded, while the potential of both the rear grid 72 and all of the rest of the system (including the magnet 24, the electrostatic analyzer chamber 50 and the detector 32) is varied by a programmable power supply. The voltage range over which the rear grid 72 and the rest of the system is changed, or swept, as well as the sweep rate, is determined by the particular application for which ions are to be detected. In one application for a comet ion detection, the grid 72 was swept alternately from −700 to +8000 V and from −8000 to +700 V, during periods of 0.063 second. The instrument was designed for use on a spacecraft that was rapidly rotating, to enable ion detection over a wide energy range and over a field of view of large elevation angle (12) (and 360° of azimuth angle provided by spacecraft rotation).

Figure 5:
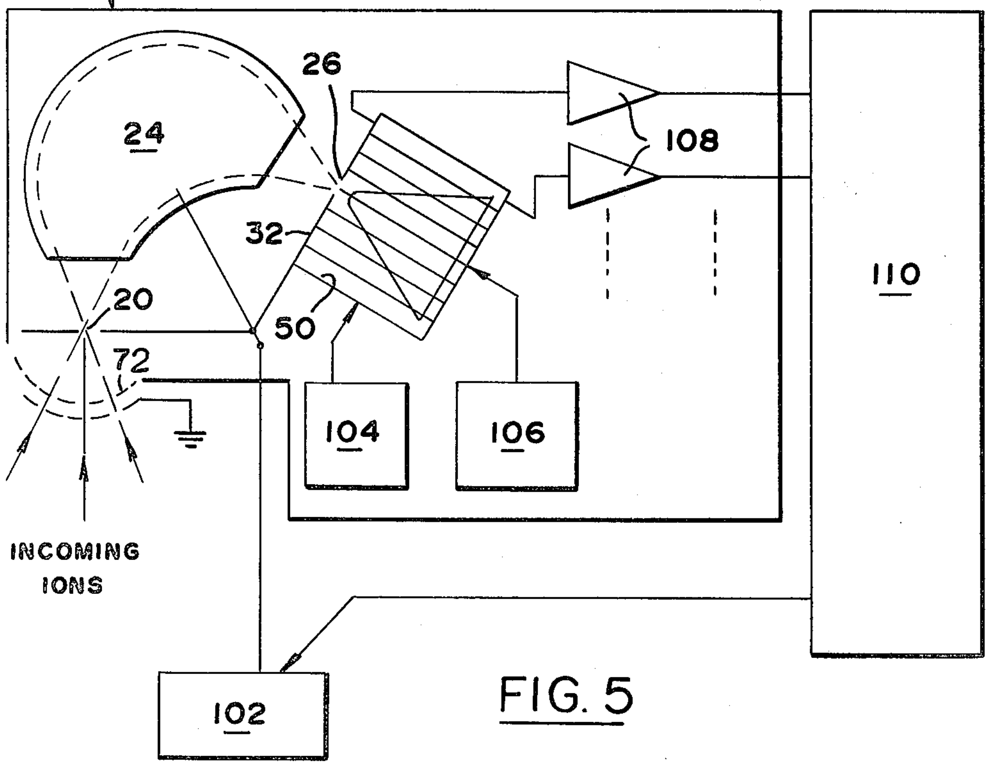
FIG. 5 is a block diagram view of the apparatus of FIG. 1.

FIG. 5 shows additional details of the electronic circuitry which could be used to operate this type of ion mass spectrometer system 10. One high voltage power supply 102 is connected to most elements of the system, including the second grid 72 of the grid accelerator 16, the magnet 24, a "O" or reference voltage location of the walls of the electrostatic chamber 50, and the sensor 32. This voltage is swept to permit ions of a variety of energies to pass through the system. Another high voltage power supply 104 energizes the walls of the electrostatic chamber 50 while still another power supply 106 energizes the elements of the ion detector 32. The outputs of numerous elements of the ion detector 32 are delivered through amplifier circuits 108 to a central processing circuit 110. The processing circuit records the ion detections, noting the particular location on the ion detector at which the detection is made, as well as the parameters of the system including the voltage applied to the accelerator grid 72 and the position of the apparatus.

Thus, the invention provides an ion mass spectrometer apparatus, which accepts ions over a wide elevation angle, which detects such ions, and which can indicate the elevation angle of each detected ion, as well as its mass to charge ratio and its energy. This is accomplished by employing a magnetic analyzer with a wide gap and unobstructed path that permits the passage of a wide angle of ions therethrough, and by providing an electrostatic analyzer with a two dimensional detector. The two dimensional detector detects ions falling over an area of considerable length and width and senses the ion position along both of these dimensions.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. An ion mass spectrometer apparatus comprising;

a magnetic analyzer which includes entrance and exit openings, and a sector magnet that passes ions of selected momentum characteristics along a wide range of paths that extend between the openings while preserving the angle of their velocity vector with respect to a centerline of said path, at said openings; and an electrostatic analyzer located downpath of said magnetic analyzer exit opening and positioned to receive ions leaving therefrom, said analyzer including walls forming a chamber having width, length, and height dimensions, said analyzer also having means for applying an electrical potential that deflects ions moving largely lengthwise of the chamber, along the height dimension in accordance with at least the mass to charge ratio of the ion;

said electrostatic analyzer also including an ion sensor which senses ions along a wall of said chamber, said sensor constructed to detect the position of an ion along the width dimension of the chamber as well as along another dimension.

2. The apparatus described in claim 1 wherein:

said magnetic analyzer openings are slit shaped, and the slit-shaped exit opening extends in a plane parallel to the height of the chamber.

3. The apparatus described in claim 1 wherein:

said magnetic analyzer forms an unobstructed path for ions to pass between said entrance and exit openings, for ions moving within an angle of at least about 30° on either side of an imaginary centerline at said entrance opening.

4. An ion mass spectrometer comprising:

an accelerator device which includes a pair of adjacent concentric grids, and a voltage source for scanning the voltage of a rearwardmost one of said grids;

a magnetic analyzer which includes a sector magnet, walls forming an entrance opening aligned with said accelerator device, and walls forming an exit opening, the magnet being aligned with the openings to pass ions from the entrance opening through the magnet to the exit opening; and an electrostatic analyzer including a chamber with an opening that is substantially coincident with said exit opening of the magnetic analyzer, and including means for maintaining an electric field across a height dimension of the chamber for deflecting ions moving primarily in a length direction as they enter the chamber, said electrostatic analyzer also including a two dimensional ion sensor that detects the deflection of an ion by the electric field and also detects the position of an ion in a width direction perpendicular to said height and length directions.

5. A method for detecting and analyzing ions, comprising:

passing ions along paths extending through a pair of spaced slits and through a magnetic field extending perpendicular to said paths and positioned between said slits, to pass only ions of a particular momentum to charge ratio, including passing ions entering a first of said slits that are travelling along any direction within an angle on the order of magnitude of 30° from a predetermined centerline direction;

electrostatically deflecting ions exiting from a second of said slits, in a direction largely perpendicular to their paths, and detecting the distance traversed by each ion during its deflection largely perpendicular to its initial path at said second slit to detect the mass to charge ratio of the ion, including determining the position of each detected ion along a second direction which is largely perpendicular to the path of the ion and to said direction in which the ion is deflected.

6. An ion mass spectrometer comprising:

walls forming a chamber having width, length and height dimensions, and having opposite ends separated by the chamber length and an entrance opening in one of said ends;

means for applying an electric potential across the height of said chamber, to deflect ions entering said entrance opening, along the height dimension of the chamber; and an ion sensor positioned at a chamber wall, said sensor having a length and width along the length and width dimensions of the chamber, said sensor constructed to indicate the position along its width and length at which an ion is detected.

* * * * *